United States Patent [19]
Koenig

[11] Patent Number: 5,862,710
[45] Date of Patent: Jan. 26, 1999

[54] ZERO LASH JOINT FOR A ROTATING CONDUIT FITTING FOR A REMOTE CONTROL CABLE ASSEMBLY

[75] Inventor: Peter C. Koenig, Moberly, Mo.

[73] Assignee: Dura Automotive Systems, Inc., Rochester Hills, Mich.

[21] Appl. No.: 757,830

[22] Filed: Nov. 27, 1996

[51] Int. Cl.[6] ........................................ F16C 1/10
[52] U.S. Cl. .................. 74/502.4; 74/500.5; 74/501.5 R
[58] Field of Search .............................. 74/502, 501.5 R, 74/500.5, 502.4, 502.6

[56] References Cited

U.S. PATENT DOCUMENTS

| | | | |
|---|---|---|---|
| 4,333,361 | 6/1982 | Spease | 74/501 |
| 4,348,348 | 9/1982 | Bennett et al. | 264/255 |
| 4,386,755 | 6/1983 | Bennett et al. | 249/83 |
| 4,406,177 | 9/1983 | Bennett et al. | 74/501 |
| 4,726,251 | 2/1988 | Niskanen | 74/502 |
| 4,763,541 | 8/1988 | Spease | 74/502.4 |
| 4,790,205 | 12/1988 | Stocker | 74/500.5 |
| 4,793,050 | 12/1988 | Niskanmen | 29/455 |
| 4,860,609 | 8/1989 | Spease | 74/502 |
| 4,951,524 | 8/1990 | Niskanen | 74/502 |
| 5,003,838 | 4/1991 | Pospisil et al. | 74/502 |
| 5,144,856 | 9/1992 | Roca | 74/501.5 R |
| 5,161,428 | 11/1992 | Petruccello | 74/502 |
| 5,383,377 | 1/1995 | Boike | 74/502 |

FOREIGN PATENT DOCUMENTS

| | | | |
|---|---|---|---|
| 0183341 | 6/1986 | European Pat. Off. | 74/502.4 |
| 2644532 | 9/1990 | France | 74/502.6 |
| G 94 00 555.9 | 3/1994 | Germany | F16C 1/14 |
| 362067 | 8/1938 | Italy | 74/502.4 |
| 978314 | 12/1964 | United Kingdom | 74/502.4 |
| 2040383 | 8/1980 | United Kingdom | 74/502.4 |
| 2151758 | 7/1985 | United Kingdom | 74/502.4 |

*Primary Examiner*—Vinh T. Luong
*Attorney, Agent, or Firm*—Michael D. Bednarek; Kilpatrick Stockton LLP

[57] ABSTRACT

An end fitting for use in a remote control cable assembly of the type having a control cable that includes a conduit and a wire-like strand or core element. The end of the strand is typically attached to a slider rod that extends within a swivel tube. The swivel tube is supported within a swivel socket provided in the end fitting. The end fitting allows for easy rotation of the end fitting relative to the axis of the conduit without adding additional lash into the cable system from the rotating end fitting joint. The end fitting has two pieces, a molded sleeve and a rotating fitting. The molded sleeve is fastened directly onto and along the longitudinal axis of the conduit such that the molded sleeve is fixed against longitudinal movement relative said conduit end. The molded sleeve includes a partial spherical ball portion and a cylindrical portion. The rotating fitting is rotatably disposed about the molded sleeve and is used to attach the conduit end to a support structure. The rotating fitting includes a partial spherical cavity portion for receiving the spherical portion of the molded sleeve and a cylindrical cavity for receiving the cylindrical portion of the molded sleeve. The partial spherical ball portion of the molded sleeve and the partial spherical cavity portion of the rotating fitting mate together to form a partial spherical or annular snap fit.

9 Claims, 1 Drawing Sheet

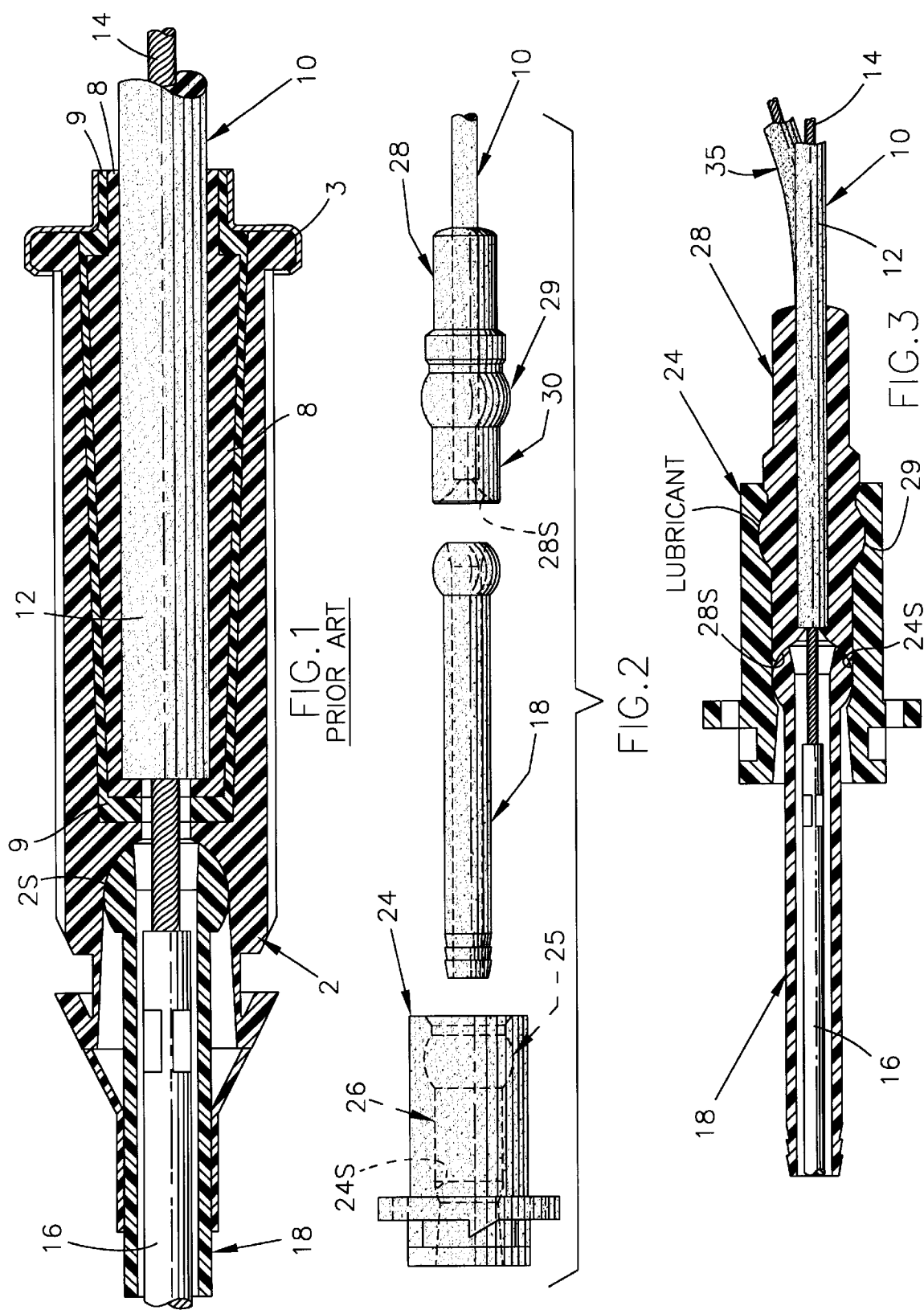

5,862,710

ZERO LASH JOINT FOR A ROTATING CONDUIT FITTING FOR A REMOTE CONTROL CABLE ASSEMBLY

BACKGROUND

1. Field of the Invention

The present invention relates to a conduit end fitting for a motion transmitting remote control cable assembly of the type used in transmission shift cables, park brake cables and light duty control cables and a method for making such a fitting.

2. Background Art

Motion transmitting remote control cable assemblies are used for transmitting both force and travel along a curved path in aircraft, automotive, and marine environments. Known cable assemblies can be used for transmitting load and motion in both push and pull type applications. In the automotive environment, typical applications include but are not limited to parking brake, accelerator, hood release, brake release, trunk release, park lock, tilt wheel control, fuel filler door, transmission shifter cables and hydraulic control cables. One specific use of such remote control assemblies is the positioning of throttle and transmission shift members in automobiles.

Motion transmitting remote control assemblies for transmitting motion in a curved path typically include flexible core element (strand) slidably enclosed within a flexible outer sheath (conduit) with end fittings attached to both ends of each respective member. These fittings attach to and react load from the conduit to its mounting points and from the strand to its mounting points respectively. The core element is adapted at one end to be attached to a member to be controlled whereas the other end is attached to a manual actuator for longitudinally moving the core element. Thus, in the automotive environment, for example, assemblies normally include one or more fittings secured to the conduit for attaching the conduit to a support structure of the automobile.

The conduit end fittings must remain attached to the conduit while resisting relative axial movement (lash) between the conduit and the conduit end fittings. These conduit end fittings may be attached to the conduit in many ways, which can include: over molding, gluing, press fitting, screw on, spin welding, staking as well as many other methods. Although all these methods provide for a strong joint that resists axial movement, unfortunately, they all eliminate relative rotational movement between the conduit and the conduit end fittings.

Having the conduit end fittings fixed against rotation relative to the conduit creates a problem in that, during the assembly operation, the operator frequently has to twist the conduit end fitting along the axis of the conduit in order to line it up and install it in the mounting point. When the conduit end fitting is fixed against rotation relative to the conduit, this twisting operation has the detrimental effect of, among other things, slowing down the assembly process and twisting and binding the conduit. To eliminate the assembly problems, it is desirable to have conduit end fittings on the conduit that provide for easy rotation about the axis of the conduit, and thus speed up the assembly time and reduce binding and twisting of the conduit.

One example of a known conduit end fitting product is shown in FIG. 1. As shown, the control cable 10 includes a conduit 12 and a wire-like strand or core element 14. The end of the strand 14 is attached to a slider rod 16 that extends within a swivel tube 18. The swivel tube 18 is supported within a swivel socket provided an the conduit end fitting. The conduit end fitting of this prior art design includes a hard plastic sleeve 8 molded onto an end of the conduit. A compressible isolator 9 is molded or pressed over the molded sleeve. The sleeve and isolator are tapered toward the end of the conduit and contained within molded outer fitting 2. A spherical cavity or socket 2s for receiving the swivel tube is formed entirely within the outer fitting 2 at the one of the conduit end fitting. The opposite end of the conduit end fitting, i.e., the end that receives the conduit, is capped with a cap, which is typically formed of metal. This design does not, however, include any means to facilitate rotation of the end fitting relative to the conduit.

In addition, because the spherical socket or cavity for receiving the swivel tube 18 is formed entirely within the outer fitting 2, the swivel tube must be snapped into the socket during assembly. As a consequence, the spherical extent of the socket is limited and the degree to which the swivel tube is securely retained within the socket is also limited.

It is known to make conduit end fittings that rotate about the axis of the conduit. Conduit end fittings that rotate about the axis of the conduit are shown, for example, in U.S. Pat. Nos. : 4,860,609; 4,951,524; 5,161,428 and 5,383,377.

U.S. Pat. No. 4,860,609 discloses a flexible motion transmitting core element that includes a conduit (12), a flexible motion transmitting core element (14) that is slidably supported by the conduit and a connector member (16) that includes an annular radially extending flange (18). The assembly (10) further includes an end fitting (30) having a cylindrical portion (32). The cylindrical portion (32) is positioned over the outer surface of the connector member (16) such that the cylindrical portion (32) abuts the flange (18). A retainer (38) simultaneously engages the end fitting (30) and the flange (18) for preventing relative axial movement between the conduit (12) and the end fitting (30) while permitting relative rotational movement therebetween.

U.S. Pat. No. 4,951,524 discloses a flexible motion transmitting core element (28) that includes a supporting fitting (14) having first and second ends defining a first axis for extending through a substantially U-shaped seat (18) in a support structure (20). A core element (28) is movably supported by the support fitting (14) for transmitting motion between the ends thereof. The assembly (10) includes a pair of spaced flanges (52, 52', 54, 54o) supported about the support fitting (14) for allowing relative rotation therebetween and positioning the support fitting (14) in the substantially U-shaped seat (18) on the support structure (20).

U.S. Pat. No. 5,161,428 discloses a motion transmitting remote control assembly (10) for transmitting forces along a curved path by a flexible core element (26) slidably disposed within a flexible conduit (12). The assembly (10) includes an elongated member (62) for adjusting the longitudinal position of the conduit (12) by being slidably disposed within a passageway (68) of a support member (32). A locking clip (86) is movable between a disengaged position for permitting relative longitudinal movement between the elongated member (62) and the base (32) and an engaged position for preventing longitudinal movement therebetween. The elongated member (62) is rotatably supported on the conduit (12) to allow rotation of the conduit (12) relative to the support member (32) while in an engaged position.

U.S. Pat. No. 5,383,377 discloses a flexible motion transmitting core element (54) that includes a conduit (12) and a cable (54) that is movably supported along its length within the conduit (12). A support member (48) attaches one end (14) of the conduit (12) to a support structure (46). An isolator (96) is disposed between the support member (48) and the conduit end (14). The conduit end (14) has an integral conduit end fitting (18). The isolator (96) dampens vibrations and shocks transmitted between the support member (48) and the conduit end (14). The isolator (96) is fixed against translational movement relative to the conduit end (14). An anti-stick coating (106) disposed on the outer surface (100) of the conduit end fitting (18) allows the conduit end (14) and conduit end fitting (18) to rotate relative to the support member (48).

The assemblies described in these patents each have some disadvantage, however. For example, the fittings may introduce extra lash into the cable assembly, which in turn reduces the travel efficiency of the push pull cable system. The fittings may also complicate assembly and increase capital and labor expense.

Another known assembly is described in U.S. Pat. No. 4,726,251, which discloses a flexible core element (12) in a conduit (18) and a method of making same. An end fitting (20) is disposed about the conduit (18) by a cylindrical section which includes abutments (24). A vibration dampener (16) includes a cylindrical tube disposed about the end fitting (20) with grooves (28) aligned with the abutments (24) and tabs (30) extending radially outward from the vibration dampener (16). A support (14) includes a cylindrical wall (32) disposed about and coextensive with the vibration dampener (16) with openings (34) aligned with the tabs (30) of the vibration dampener (16). The vibration dampening means (16) is in axial mechanical interlocking engagement with the end fitting (20) and support (14) for maintaining the vibration dampener (16) free of radial compressive forces.

Likewise, U.S. Pat. No. 4,793,050 discloses a flexible core element (12) in a conduit (18) and a method of making same. An end fitting (20) is disposed about the conduit (18) by a cylindrical section which includes abutments (24). A vibration dampener (16) includes a cylindrical tube disposed about the end fitting (20) with grooves (28) aligned with the abutments (24) and tabs (30) extending radially outward from the vibration dampener (16). A support (14) includes a cylindrical wall (32) disposed about and coextensive with the vibration dampener (16) with openings (34) aligned with the tabs (30) of the vibration dampener (16). The vibration dampener (16) is in axial mechanical interlocking engagement with the end fitting (20) and support (14) for maintaining the vibration dampener (16) free of radial compressive forces.

U.S. Pat. No. 5,003,838 discloses a flexible motion transmitting core element assembly (10) that includes a conduit (16) with a male end fitting (20) molded at one end, which engages with a female end fitting (30). The female end fitting (30) includes a conduit (38) and attaches to a support structure (90). Splining (24, 32) is provided on the engaging portions of the male end fitting (20) and the female end fitting (30) to allow for precise rotational adjustment and locking between the male end fitting (20) and the female end fitting (30).

U.S. Pat. No. 4,406,177 and U.S. Pat. No. 4,348,348 disclose a flexible motion transmitting core element that includes a flexible motion transmitting core element and a flexible conduit. An end fitting is disposed about the end portion of the conduit for supporting the conduit and core element with the core element extending from the end fitting. The assembly also includes a support housing for supporting the end fitting and the conduit on a support structure. A resilient vibration dampener is disposed between the support housing and the end fitting for providing noise and vibration isolation therebetween. A mold assembly and a method are also disclosed for making the motion transmitting remote control assembly including the steps of; inserting the end portion of the conduit into a cavity of a first mold and injecting organic polymeric material into the cavity for molding the end fitting about the conduit, inserting the end fitting into a cavity of a second mold and injecting a vibration dampening material into the mold for molding a vibration dampener about the end fitting, and placing the vibration dampener into a cavity of a third mold and injecting an organic polymeric material for molding a support housing about the vibration dampener.

Similarly, U.S. Pat. No. 4,386,755 discloses a mold assembly and a method for making a motion transmitting remote control assembly including the steps of; inserting the end portion of the conduit into a cavity of a first mold and injecting organic polymeric material into the cavity for molding the end fitting about the conduit, inserting the end fitting into a cavity of a second mold and injecting a vibration dampening material into the mold for molding a vibration dampener about the end fitting, and placing the vibration dampener into a cavity of a third mold and injecting an organic polymeric material for molding a support housing about the vibration dampener.

Notwithstanding these prior art disclosures, there remains a need for an end fitting for a remote control cable assembly that is easy to assemble and allows for easy rotation of the end fittings relative to the axis of the conduit and does not add additional lash into the cable system from the rotating end fitting joint.

SUMMARY OF THE INVENTION

The present invention overcomes the disadvantages of the known systems described above by providing an end fitting for a remote control cable assembly that allows for easy rotation of the end fittings relative to the axis of the conduit without adding additional lash into the cable system from the rotating end fitting joint. This is accomplished by a two piece conduit end fitting assembly that connects the conduit to its mounting point.

The first piece, a molded sleeve, is fastened directly onto and along the longitudinal axis of the conduit and is characterized by a partial spherical ball feature for receiving and retaining the second piece. The first piece is further characterized by the front having a partial spherical cavity for receiving and supporting a swivel tube and also by the body containing a cylindrical portion for guiding the rotational movement of the second piece.

The second piece, a rotating fitting, is characterized by having a partial spherical cavity for receiving the partial spherical ball of the first piece. The second piece is further characterized by having a cylindrical cavity for receiving the cylindrical portion of the first piece and maintaining its rotational movement along the axis of the first piece and the conduit.

The partial spherical ball portion of the first piece and the partial spherical cavity portion of the second piece mate together to form a partial spherical or annular snap fit. The partial spherical ball portion of the first piece and the partial spherical cavity portion of the second piece are dimensioned such that, when assembled together, their fit ranges from zero clearance to a slight interference condition. The assembly is further characterized by having a lubricant on both mating surfaces of the annular snap fit to facilitate assembly and enhance the rotation of tho second pieces relative to the first.

The assembly is further characterized by the zero clearance to slight interference fit between the male and female portion of the annular snap fit serving the function of not allowing any extra lash to be introduced into to the assembly through the rotating joint and thus improving the overall cable travel efficiency versus the prior art.

BRIEF DESCRIPTION OF THE DRAWINGS

FIG. 1 is a cross sectional view of a prior art end fitting design;

FIG. 2 is an exploded side view of a zero lash end fitting according to the present invention;

FIG. 3 is a cross section of the zero lash end fitting according to the FIG. 2.

DETAILED DESCRIPTION

The present invention is an end fitting that is particularly well suited for use in a remote control cable assembly of the type having a control cable 10 that includes a conduit 12 and a wire-like strand or core element 14. As mentioned above, the conduit and strand are typically flexible to allow for transmission of motion along a curved path, an example of which is shown at 35 in FIG. 3. The end of the strand 14 is typically attached to a slider rod 16 that extends within a swivel tube 18. The swivel tube 18 is supported within a swivel socket provided in the end fitting.

The end fitting of the present invention allows for easy rotation of the end fitting relative to the axis of the conduit without adding additional lash into the cable system from the rotating end fitting joint. This is accomplished by a two piece conduit end fitting assembly that connects the conduit to its mounting point. The currently preferred embodiment of the present invention will now be described in connection with FIGS. 2 and 3. In this description, the two pieces will be referred to as the molded sleeve 28 and the rotating fitting 24. It should be understood, however, that the outer surface of the rotating fitting 24 could take any form that is suitable for mounting in a fitting.

The molded sleeve 28 is fastened directly onto and along the longitudinal axis of the conduit 12. As shown in FIGS. 2 and 3, the molded sleeve 28 includes a partial spherical ball portion 29 for receiving and retaining the rotating fitting 24 and a cylindrical portion 30 for guiding the rotational movement of the rotating fitting 24. The molded sleeve 28 also includes a partial spherical cavity 28s for receiving and supporting a swivel tube 18.

The rotating fitting 24 includes a partial spherical cavity 25 receiving the spherical ball 29 of the molded sleeve 28 and a cylindrical cavity 26 for receiving the cylindrical portion 30 of the molded sleeve 28 and maintaining its rotational movement along the axis of the molded sleeve 28 and the conduit 12. The rotating fitting may also include a partial spherical cavity or seat 24s for receiving and supporting a swivel tube 18.

The partial spherical ball portion 29 of the molded sleeve 28 and the spherical cavity portion 25 of the rotating fitting 24 mate together to form a partial spherical or annular snap fit. More specifically, the partial spherical ball portion 29 of the molded sleeve 28 and the partial spherical cavity portion 25 of the rotating fitting 24 are dimensioned such that when assembled together, their fit ranges from zero clearance to a slight interference condition. By virtue of this zero clearance to slight interference fit between the male and female portion of the annular snap fit, the end fitting does not introduce any extra lash into the assembly through the rotating joint. As a consequence, overall cable travel efficiency is improved in comparison to prior art designs that introduce lash.

To facilitate assembly and enhance the rotation of the rotating fitting 24 relative to the molded sleeve 28, a lubricant is preferably provided on both mating surfaces of the annular snap fit. This obviates the need to provide a circumferential anti-stick surface contiguous with either or both mating surfaces or an anti-stick coating on either or both mating surfaces.

It will be appreciated that the present invention provides several significant advantages over prior art adjusters. In general, these advantages may be characterized as significantly reduced lash, greater simplicity and improved reliability.

While in accordance with the Patent Statutes, the preferred forms and embodiments of the invention have been illustrated and described, it will be apparent to those skilled in the art that other changes and modifications may be made without deviating from the inventive concepts set forth above.

I claim:

1. A conduit end fitting that allows for easy rotation of the end fitting relative to a conduit used in a remote control cable assembly, wherein the conduit has an axis and wherein the assembly includes a swivel tube, the end fitting comprising:

a molded sleeve fastened directly onto and along the axis of the conduit, the molded sleeve including a partial spherical ball portion, a cylindrical portion, and a partial spherical cavity for receiving and supporting the swivel tube;

a rotating fitting, the rotating fitting comprising a partial spherical cavity portion for receiving the partial spherical portion of the molded sleeve and a cylindrical cavity for receiving the cylindrical portion of the molded sleeve;

wherein the partial spherical ball portion of the molded sleeve and the partial spherical cavity portion of the rotating fitting mate together to form a partial spherical or annular snap fit; and wherein the partial spherical ball portion of the molded sleeve and the partial spherical cavity portion of the rotating fitting are dimensioned such that, when assembled together, the end fitting does not introduce any extra lash into the assembly through the rotating fitting.

2. The conduit end fitting of claim 1, wherein the partial spherical cavity is formed by two distinct portions of the molded sleeve and the rotating fitting.

3. A conduit end fitting that allows for easy rotation of the end fitting relative to a conduit used in a remote control cable assembly, wherein the conduit has an axis, the end fitting comprising:

a molded sleeve fastened directly onto and along the axis of the conduit, the molded sleeve including a partial spherical ball portion and a cylindrical portion;

a rotating fitting, the rotating fitting comprising a partial spherical cavity portion for receiving the partial spherical portion of the molded sleeve and a cylindrical cavity for receiving the cylindrical portion of the molded sleeve;

a lubricant between the mating surfaces of the annular snap fit to facilitate assembly and enhance the rotation of the rotating fitting relative to the molded sleeve;

wherein the partial spherical ball portion of the molded sleeve and the partial spherical cavity portion of the rotating fitting mate together to form a partial spherical or annular snap fit; and wherein the partial spherical ball portion of the molded sleeve and the partial spherical cavity portion of the rotating fitting are dimensioned such that, when assembled together, the end fitting does not introduce any extra lash into the assembly through the rotating fitting.

4. A motion transmitting remote control assembly of the type for transmitting motion along a curved path, said assembly comprising:

a conduit having an end and a longitudinal axis;

a flexible motion transmitting core element having a length and a central axis and movably supported along said length within said conduit;

a molded sleeve fastened directly onto and long the longitudinal axis of the conduit such that the molded sleeve is fixed against longitudinal movement relative said conduit end, the molded sleeve including a partial spherical ball portion and a cylindrical portion;

a rotating fitting rotatably disposed about said molded sleeve for attaching said conduit end to a support structure, the rotating fitting comprising a partial spherical cavity portion for receiving the partial spherical portion of the molded sleeve and a cylindrical cavity for receiving the cylindrical portion of the molded sleeve;

wherein the partial spherical ball portion of the molded sleeve and the partial spherical cavity portion of the rotating fitting mate together to form a partial spherical or annular snap fit.

5. The motion transmitting remote control assembly of claim 4, wherein the partial spherical ball portion of the molded sleeve and the partial spherical cavity portion of the rotating fitting are dimensioned such that, when assembled together, the fit of the partial spherical ball portion and the partial spherical cavity portion does not introduce any extra lash into the assembly through the rotating fitting.

6. The motion transmitting remote control assembly of claim 4, wherein the rotating fitting is fixed against longitudinal movement relative to molded sleeve.

7. The motion transmitting remote control assembly of claim 4, wherein the partial spherical socket is formed by two distinct portions of the molded sleeve and the rotating fitting.

8. The motion transmitting remote control assembly of claim 4, wherein the assembly includes a swivel tube and the molded sleeve includes the partial spherical cavity for receiving and supporting the swivel tube.

9. The motion transmitting remote control assembly of claim 4, further comprising a lubricant between the mating surfaces of the annular snap fit to facilitate assembly and enhance the rotation of the rotating fitting relative to the molded sleeve.

* * * * *